Sept. 27, 1949.                    H. H. THOMPSON                    2,482,809
                              RADIO CRAFT GUIDANCE SYSTEM
Filed April 8, 1948                                              3 Sheets-Sheet 1

INVENTOR
HERBERT H. THOMPSON
BY
Thomas M. Ferrill, Jr.
ATTORNEY

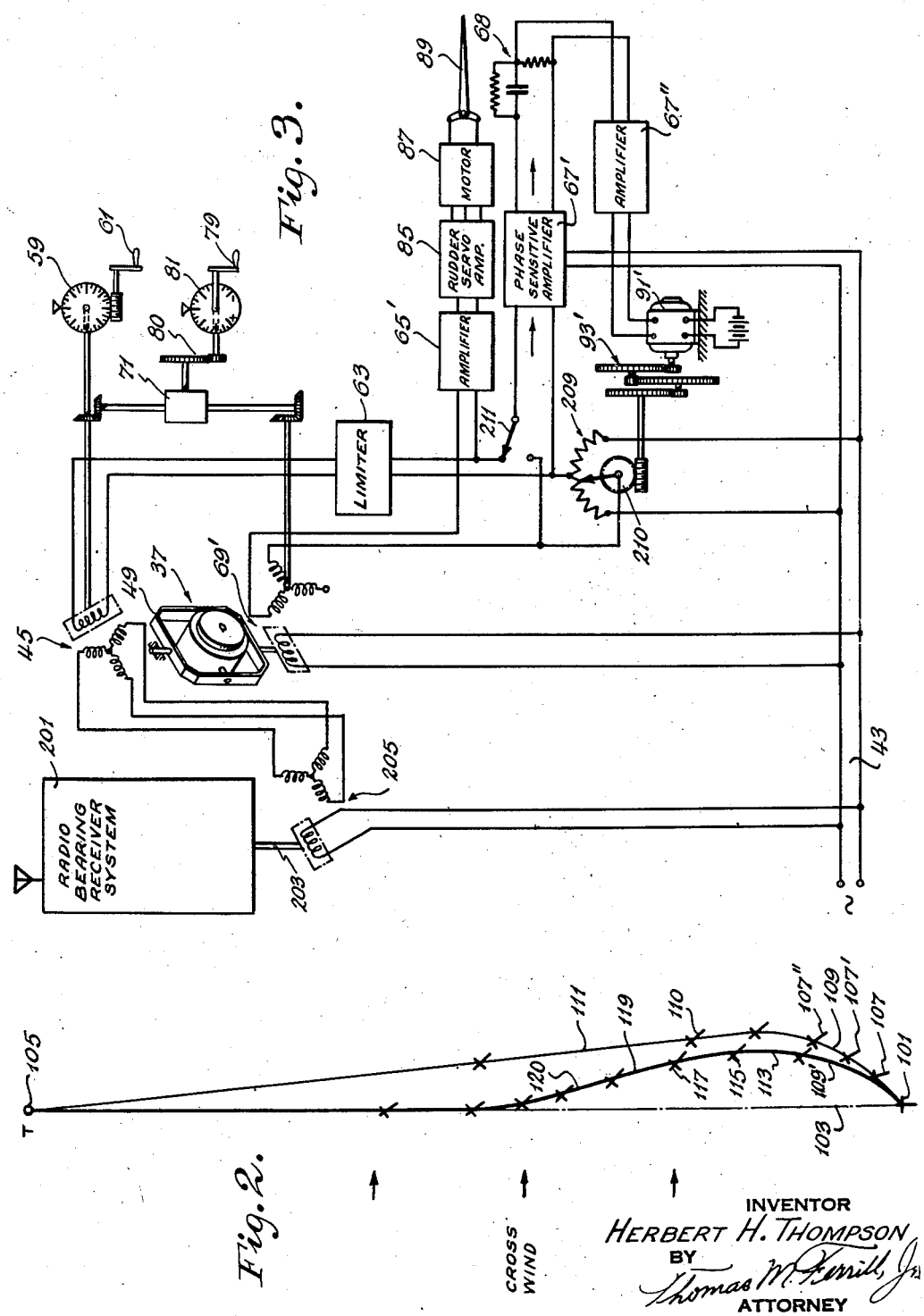

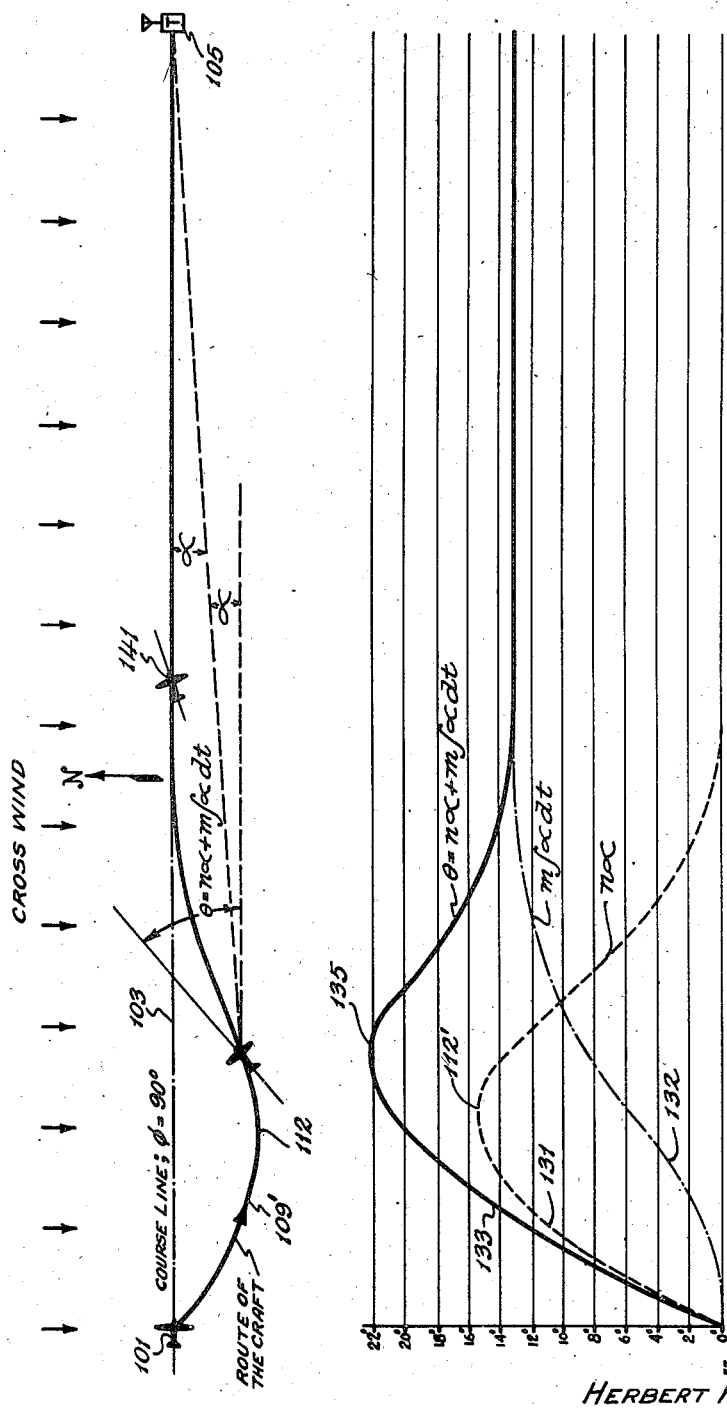

Patented Sept. 27, 1949

2,482,809

UNITED STATES PATENT OFFICE 2,482,809

RADIO CRAFT GUIDANCE SYSTEM

Herbert H. Thompson, Huntington, N. Y., assignor to The Sperry Corporation, Great Neck, N. Y., a corporation of Delaware Application April 8, 1948, Serial No. 19,711

12 Claims. (Cl. 343—117)

This invention relates to direction finding systems for dirigible vehicles, such as aircraft and ships, and is especially concerned with arrangements for guidance of such vehicles along a selected line or path to a radio station.

An object of the invention is to provide an improved homing course radio guidance system.

More particularly it is an object of the invention to provide a system capable of guidance of a craft along a selected path or line of movement to the station, irrespective of cross currents or athwartship currents in the medium wherein the vehicle moves, such as athwartship air currents tending to cause an aircraft to deviate from the course.

In U. S. Patent 2,419,970 to R. B. Roe et al., there is shown an automatic flight system comprising an automatic pilot and a radio positional reference system. These are coupled together in such a way as to hold the craft on a heading (compass direction of the fore-and-aft axis of the craft) normally corresponding to the predetermined compass bearing of the received radio station; and to change the heading of the craft proportionally with change of the observed compass bearing of the station, through an angle equal to a predetermined multiple of the observed change of bearing. In U. S. Patent 2,423,337 to F. L. Moseley, a generally similar control arrangement is applied to an automatic radio range following system. Systems of the type described in these patents operate quite satisfactorily to guide the craft along the selected course line in the absence of cross wind. If a persistent cross wind is encountered with such a system, however, the craft will travel to the destination along a route displaced from the selected course.

In the present invention, guidance of the craft along the originally selected course is provided irrespective of a cross current or cross wind conditions, by the incorporation of a displacement integration system in the circuits coupling the positional reference device and the automatic pilot. Taking $\phi$ as the compass bearing of the destination (e. g. of a radio transmitting station toward which a "homing" course is desired), $\alpha$ as the angle of departure of subsequent observed bearings of the station from the initial bearing $\phi$, and $\theta$ as the angular departure of the heading of the craft from the direction parallel to the selected course bearing $\phi$, the Roe et al. patent system controls the craft in such a way as to hold $\theta = n\alpha$, where $n$ is a factor appreciably greater than one, and may be made variable with distance of the craft from the homing reference radio station. The present invention, on the other hand, controls the craft in such a way as to hold $\theta = n\alpha + m\int\alpha dt$. With the present invention, a cross current such as a cross wind causes a temporary displacement of the craft from the course, but the craft is returned to the course and held to the course with an ultimate crab-wise heading determined by the time integral of displacement from the course.

The above stated objects and brief description of the invention, as well as further objects and features, will now be made apparent from a full description given in relation to the appended drawings, wherein:

Fig. 1 is a schematic diagram of a radio direction finder and automatic pilot homing system incorporating the present invention;

Fig. 2 is a diagram illustrating the course and headings of the craft;

Fig. 3 is a further embodiment of the invention; and

Fig. 4 is a graph showing an analysis of the changes of heading of the craft.

Referring now to Fig. 1, an automatic radio direction finder is shown including a rotatable loop antenna 11 coupled to a pair of input terminals 13 of a radio receiver 15. A non-directional or "sense" antenna 17 is connected to a further terminal 19 of the direction finder receiver 15. This receiver may be of the type illustrated in U. S. Patent No. 2,257,757 to Francis L. Moseley, dated October 7, 1941. A reversible motor 21 is coupled to the loop antenna 11 through a gear train 23 and arranged to turn it to a direction with its axis aimed toward a radio station from which the radio energy is received, as described in the aforementioned Moseley patent.

The motor 21 may be coupled directly to the amplifier output terminals of the receiver 15, as with the double throw switch 25 in the position illustrated in the diagram; or the receiver output may be applied to an integrator motor 27 by transfer of the arms of switch 25 to their lower position. Motor 27 is coupled through a gear train 29 to a differential Selsyn unit 31 linked by further Selsyn units 33 and 35 respectively to a directional gyroscope 37 and the loop antenna 11. Units 33, 31 and 35 are so connected that Seysyn unit 35 provides an error output signal whenever the angular displacement between antenna 11 and gyroscope 37 is unequal to the angular setting of the rotor of differential Selsyn unit 31. This error output of signal generator Selsyn 35 is supplied to a phase sensitive amplifier 39, and the output circuit of amplifier 39 is coupled through switch 25 to the loop drive motor 21. With the switch blades in the lower position, units 35, 39 and 21 stabilize the loop antenna 11 in azimuth in direct reliance upon the directional gyroscope 37, and provide for gradual modification of the azimuthal orientation of the loop antenna 11 according to the integrated value of the output signals from the radio receiver 15. The feature of azimuth stabilization of the loop antenna is dealt with more fully in patent application Serial No. 9,265 filed February 18, 1948, in the name of Edward C. Streeter, Jr.

With the blades or contact arms of switch 25 thrown to either of the contact positions, the direction finder receiver system 17, 15, 21 acts to retain the axis of antenna 11 pointed toward the radio station from which energy is received.

A transmitter Selsyn 41 is coupled to the loop antenna 11 and energized from the supply means 43. A Selsyn receiver or repeater 44 may be connected to Selsyn 41 to provide indication at any desired operating position of the direction of the loop antenna 11, and hence, of the direction of the received radio station relative to the heading of the aircraft.

The three-terminal output circuit of the Selsyn transmitter 41 is connected to the three-winding circuit of a further Selsyn unit 45 employed as a signal generator with its shaft 47 coupled to the vertical-axis pivoted main gimbal ring 49 of the directional gyroscope 37. The normally stationary part of the Selsyn signal generator 45 is also made rotatable, and is coupled through a shaft 53 and mitre gear sets 55 and 57 to a 360° course setting dial 59 coupled to a hand crank 61. Dial 59 is arranged to be set to the selected course direction $\phi$, so that unit 45 will provide output signals corresponding to $\alpha$. The output winding of the Selsyn signal generator 45 is connected to the input circuit of a limiter amplifier system 63, the output circuit of which is connected to a summation amplifier 65 and to a power amplifier 67. Amplifier 63 is so arranged as to limit the output amplitude only when the bearing of the received station has departed from the selected bearing by an excessive angle of divergence $\alpha$.

The three-winding circuit of Selsyn transmitter 33 is connected to the three-winding circuit of a further Selsyn unit 69, the output coil of which is connected to a further input circuit of the summation amplifier 65. The shaft of Selsyn 69 is coupled through differential unit 71 to shaft 73 and also to a shaft 77 coupled through mitre gears 78 and spur gears 80 to the crab angle setting hand crank 79 and dial system 81. The differential 71 is so arranged as to provide rotation of the rotor of Selsyn signal generator 69 in unison with the rotation of shaft 53 in response to adjustment of crank 61, and furthermore, to provide for angular offset of the rotor of Selsyn 69 by an angle as indicated on dial 81.

The output circuit of the summation amplifier 65 is coupled to rudder servo amplifier 85, and the output of this amplifier is connected to the rudder operating servo motor 87 which may be a steering engine of a vessel connected to its rudder 89. Where the invention is employed in an aircraft, the output circuit of the amplifier 65 may be arranged to control the ailerons as well as the rudder through suitable servo mechanism.

Selsyn units 33 and 69 are so arranged in connection with directional gyroscope 37 that a null signal is provided at leads 83 to the second input circuit of the summation amplifier 65 when the aircraft is headed in the direction corresponding to the sum of the readings of dials 59 and 81, and to give a reversible phase output signal at leads 83 when the heading of the aircraft is different from that given by the sum of the readings of the dials 59 and 81.

A miniature motor 91 is coupled through a very high ratio speed reduction gear train 93 and a slip clutch 95 to the shaft 77, so that this motor 91 is arranged to provide very gradual rotation of shaft 77 and hand crank 79, dial 81 and the rotor of Selsyn 69 so long as the craft is displaced from the selected course line. While the craft is on the course line, motor 91 is inactive.

When it is desired to have a craft guided along a selected line to a radio station, the craft is flown to a position on this selected line, as evidenced by the orientation (compass direction) of the direction finder loop 11 with its axis aimed along the selected bearing line to the station. This is indicated by the pointer 99 of Selsyn repeater 44 pointing to the compass bearing of the selected course line to the station. Hand crank 61 is rotated until dial 59 arrives at the angular position corresponding to the radio station bearing line along which flight is to be executed.

If the pilot has knowledge of a cross current condition (e. g. cross wind for aircraft) he then rotates crank 79 to set dial 81 to the angle corresponding to the heading correction angle (the "crab" angle) believed necessary for compensating for the cross current condition. The automatic pilot switch 86 is then closed to make system 65, 85, 87 operative in connection with the craft control element 89 and to provide automatic operation of the control element 89 according to the algebraic sum or resultant of the signals supplied to amplifier 65 through Selsyn 69 and limiter amplifier 63.

The servo system 65, 85, 87 thereupon operates to hold control element 89 neutrally positioned when the output voltages of Selsyn 69 and limiter 63 are balanced (including the condition of zero voltage output for each of these units), and to deflect the control element 89 to a deflection angle corresponding to unbalance occurring between these output signals from Selsyn 69 and limiter amplifier 63. The signal supplied through limiter amplifier 63 represents $\alpha$, and the signal produced by Selsyn 69 is proportional to $\theta$.

While the chaft is on the selected bearing line shown at 103 in Fig. 2, the output of limiter amplifier 63 is zero. The system 85, 87, 89 then acts to regulate the steering element 89 to suppress any output voltage from Selsyn 69, thereby holding the craft to the compass heading equal to the sum of the readings of dials 59 and 81.

If there is a cross wind, as indicated by the downwardly directed arrows in Fig. 2, the craft departs from the selected bearing line. A rising voltage representing $\alpha$ then appears at the output terminals of Selsyn 45, and is carried through to the output terminals of limiter amplifier 63, causing the servo system 65, 85, 87 to change the craft heading until the output voltage from Selsyn 69 (proportional to $\theta$) balances out the voltage supplied through limiter amplifier 63. The parts of this system are so proportioned that the angular change of heading of the aircraft required to balance a deviation signal exceeds the angular deviation of the station bearing by a selected factor $n$, which may be of the order of 5. Fig. 2 illustrates these conditions as applying to an aircraft initially at position 101, and with the control elements 59, 81 set for flight along line 103 to the radio station 105. Line 103 is a 90° bearing line to a station directly east thereof (i. e. $\phi=90°$). With the unanticipated wind from the north, the airplane departs from this line 103 to the southward so that the compass bearing of the line from the aircraft to station 105 changes in the counterclockwise sense. When the bearing reaches 89° ($\alpha=-1°$), the servo system 85, 85, 87 has turned the craft to a heading to the left of the 90° compass direction ($\phi$) through such an angle $\theta$ as to provide an output voltage from Selsyn 69 balancing the output voltage of limiter amplifier 63, and this change of heading of the craft to the left is made to be of the order of 5° to 10° depending on the desired "tightness" of the course-following action (i. e., $\theta-n\alpha=-5°$ to $-10°$).

In the absence of any manipulation of control member 79, and assuming for the moment the absence of the automatic drift corrector features including elements 67, 91, 93 and 95, the craft would proceed along the curved route 109, the heading of the craft being made to change more and more to the leftward as indicated at 107, 107' and 107'' as the craft departs farther to the right from the course 103, keeping $\theta$ at all times proportional to the angular deflection of $\alpha$ from the course 103 by the aforementioned appreciable factor $n$.

This route 109 curves to the leftward, the heading of the craft departing by a gradually increasing angle $\theta$ from the original heading parallel to course 103, until it is changed to such an extent (as at 110) that the craft moves along a substantially straight line 111 toward the station 105, and thereafter the craft continues along this line 111, the average heading remaining substantially fixed as indicated by the miniature airplane symbols therealong.

Such operation as outlined above, as would be provided in the absence of units 67, 91, 93, 95 and 77, could be useful in certain conditions, but it is often quite desirable or absolutely necessary that the craft be guided mainly along the originally selected course, as course 103 in Fig. 2. In accordance with an important feature of the present invention, the craft departure from the course 103 is limited to a mere temporary departure in a transitory phase of its operation, followed by a return to this selected line of flight 103; and the craft is made to progress thenceforth to the station 105 directly along this selected line 103. This is especially important where buildings or natural obstacles or obstructions are present in the terrain to the sides of the selected path 103, so that this path must be closely followed.

With the features of the present invention, when the craft 101 departs to the right from the selected course 103, causing a resultant output voltage through limiter amplifier 63 corresponding to the change of the bearing of the station 105, the motor 91 is supplied with power through amplifier 67 and caused to revolve in the direction for driving shaft 77 and dial 81 to provide crab angle to the left. While the rotor of motor 91 revolves at a moderate speed, the gear train 93 provides such great speed reduction that shaft 77 is made to revolve at a rate of a few degrees per minute. The effect of this operation of motor 91 is to provide even greater change of heading of the craft to the left than that which would otherwise have been maintained by elements 85, 87, 89 to balance the output of limiter amplifier 63, as indicated in Fig. 4 and as will be subsequently described more particularly in connection therewith. Accordingly, the path 113 along which the craft progresses diverges to the leftward of the originally described path 109, the heading angle of the craft becoming quite steeply deflected as illustrated at 115 and 117 from the originally selected 90° heading and course direction.

This change of the heading of the craft is of such great extent that the craft is made to approach the path 103 along a path portion 119 along which it appears destined to cross over the selected path 103. However, as the craft approaches course 103, angle $\alpha$ is decreasing, so that the output voltage of limiter amplifier 63 progressively decreases. During this time, the crab angle adjustment of the system 77, 79, 81, 69 is still increasing slightly, but at a lesser rate, but the bearing error signal at the output of limiter amplifier 63 is decreasing more rapidly. Consequently, the craft curves to the right along path portion 120 as it approaches the course 103, so that a substantially asymptotic or tangential approach to the path 103 results.

Thus, it is apparent that the mechanism 67, 91, 93, 95, 79 operates to adjust the aircraft crab angle automatically to that required for guidance of the craft along the originally selected flight line, rather than along an entirely different course due to cross wind.

The advantages of the present invention are not limited to reliance on an automatic radio direction finder of the rotatable loop type. The bearing error signal, shown provided in Fig. 1 through the cooperation of the direction finder system (elements 11, 17, 15, 21, 41) with element 45 on directional gyro 37, may alternatively be realized through reliance on a radio receiving system depending upon a special navigation reference transmitting station. This can be of the omnidirectional range type, for example. A receiver of this type relies upon detection of amplitude modulation resulting from regular rotation of a special directional antenna pattern at an omnidirectional range radio transmitting station, and upon reception of phase reference signals also transmitted from the range station. The receiver rotates an indicator shaft and dial to a setting corresponding to the bearing of the omnidirectional range transmitter station, in reliance on the phase comparison between the amplitude modulation and the phase reference modulation.

Such a receiver is indicated schematically at 201 in Fig. 3, with the indicator shaft 203 coupled to a Selsyn transmitter 205 arranged to cooperate with the Selsyn signal generator 45. Where the radio receiving system 201, 203 is of the omni-azimuth range type, so that its output is in terms of compass bearing rather than merely the direction of the transmitting station relative to craft heading, the Selsyn signal generator 45 is not coupled to the directional gyroscope 37.

The course setting and crab angle setting dials and control levers 59, 61, 79, 81 are provided as in Fig. 1, and are coupled with the differential 71 generally in the manner described in connection with Fig. 1.

A single Selsyn directional pick-off system 69' is illustrated in Fig. 3 as including a rotor portion coupled to the main gimbal ring 49 and having a winding connected to the power mains 43, the case of the instrument including the three-winding field portion being coupled for rotation along with the rotor of Selsyn 45 under the control of crank 61 and for angular displacement with respect thereto under control of the manual crab angle adjustment system 79, 80, 81.

The output voltage from signal generator Selsyn 45 is coupled through limiter amplifier 63 to an amplifier 65' feeding the input circuit of the rudder servo amplifier 85. A drift corrector system including a potentiometer 209 is connected in series with the output circuit of the limiter amplifier 63 so as to be able to provide a signal in phase reinforcement therewith, of amplitude according to the extent of angular displacement of the rotor element 210 of the potentiometer, and thus proportional to $\int \alpha dt$. This potentiometer 209 is controlled by the motor 91' and gear train 93', for extremely slow angular movement.

Whereas the gradually increasing effect of the operation of motor 91 in Fig. 1 is mechanically applied to the angular setting of Selsyn 69, to make the output of the Selsyn correspond to departure of the craft heading from a modified or shifted version of the originally selected heading, the arrangement in Fig. 3 introduces a separate and additional electrical signal in series with the output circuits of limiter amplifier 63 and the Selsyn unit 69', for making the craft assume the suitable crab angle. With the switch 211 positioned as shown in Fig. 3, the output circuit of the limiter amplifier 63 is coupled not only to the input circuit of amplifier 65' but also to the input circuit of the amplifier system 67', 67" which controls the miniature integrator drive motor 91'.

The potentiometer 209 is connected across the power mains 43, for providing (between its midtap and the rotor arm 210) a reversible-phase alternating voltage of amplitude proportional to the angular displacement of the arm from its neutral position. Double-throw switch 211 is arranged in the input circuit of amplifier 67' to permit the convenient transfer of the potentiometer output to the amplifier input connections, to have motor 91' and potentiometer 209 work in a self-neutralizing manner. With the switch blade in the lower position, the voltage at the output of potentiometer 209 causes excitation of motor 91' in the sense to return the arm 210 to the neutral position.

The output terminals of the potentiometer 209 are connected in series with the outputs of Selsyn unit 69' and limiter amplifier 63, in such a way that the algebraic sum of the voltages provided by units 69', 63 and 209 is supplied to the input circuit of amplifier 65. Since the output voltage developed by potentiometer 209 appears in series aiding with the output voltage from limiter amplifier 63, and since the steering system 65', 85, 87, 89 acts to change the heading of the craft to develop a signal at the output of Selsyn 69' opposing the output of limiter amplifier 63, it is now required to change the heading by a greater angle by the signal contribution from potentiometer 209, to balance the sum of the signals from units 63 and 209.

The motor 91' is illustrated as a reversible D. C. motor, and may be of the type operating at a speed approximately proportional to its armature supply voltage. The amplifier system therefor is shown as including a phase-sensitive amplifier 67' for supplying direct output voltage of polarity corresponding to the input signal phase. This amplifier 67' may be coupled to the input circuit of the motor supply D. C. amplifier 67" through a resistance-capacitance circuit 68 including resistance-shunted series capacitance for providing a rate-of-change output component in addition to its displacement output component.

The operation of the system of Fig. 3 is generally like that of Fig. 1. When the craft is at position 101 (Fig. 2), dial 59 is set to the heading setting corresponding to the bearing line 103 to the station, this bearing line being noted according to the angular position of the output shaft 203 of the receiving system 201. Progress of the craft is initiated in the general direction of the received radio station. Again assuming an unanticipated cross wind as illustrated in Fig. 2, the craft veers off to the right toward 107, with the result that the system 65', 85, 87 (Fig. 3) acts through the control member 89 to change the heading of the craft through an appreciable angle to the left to fly crabwise with the cross wind.

While the output voltage is supplied through limiter amplifier 63, amplifier system 67', 67" causes operation of motor 91', gradually turning the rotor of potentiometer 209 away from neutral and supplying an appreciable voltage in series with the output voltages of limiter amplifier 63 and Selsyn pick-off 69'. This voltage is in the phase or polarization for aiding the output voltage of limiter amplifier 63 and hence compelling the heading of the craft to be deflected farther to the left than would otherwise be the case. Therefore, the craft is made to return to the original course 103 long before it comes near the station 105, with its heading held to the left relative to the direction of course 103 to compensate for the cross wind, and with an appreciable output voltage of Selsyn 69' balancing the ultimately fixed output voltage from the potentiometer 209 due to the angular deflection reached by the potentiometer shaft.

When the flight is completed, the arm of switch 211 is shifted from the position shown to the opposite position, connecting the input circuit of amplifier 67' directly to the output circuit of potentiometer 209 and thus providing a signal which causes the motor 91' to restore the rotor of potentimeter 209 to its neutral position.

Thus, in Fig. 3, the use of the present invention with a radio bearing receiving system is illustrated, and furthermore this embodiment of the invention shows the use of a potentiometer or other variable voltage output device under control of the motor 91' and gear train 93', and with its output connected in series with the output circuits of limiter amplifier 63 and a heading pick-off system 69'.

The principles of operation of the embodiments in Figs. 1 and 3 may be more fully understood by reference to Fig. 4, which graphically presents an analysis of the operation of the present invention. The station 105 is again taken to be due east of the initial position 101 of the aircraft, and the desired course line 103 is thus the line of 90° bearing of station 105 ($\phi = 90°$). The cross wind is indicated by the arrows shown directed vertically downward in Fig. 4, and thus directed southward. Starting with the heading of 90° ($\theta = 0$), the aircraft diverges to the southward from the course 103, so that its route is along the curve 109'. The aircraft automatic flight control system 65', 85, 87, 89, acting to deflect the heading of the craft through an angle proportional to the output of units 45, 63, acts to deflect the heading of the craft to the extent necessary to hold angle $\theta$ proportional to $\alpha$, the angle through which the bearing of station 105 is noted to have changed from the original bearing of 90° ($\phi$). The position of maximum angular departure (maximum α) is position 112 on the path 109'. Accordingly, the maximum 112' of the curve 131 (α maximum) is reached at the time when the aircraft reaches point 112.

The component $m\int\alpha dt$ of angular deflection of the heading of the craft from the direction parallel to course 103 is represented by curve 132, which starts with zero slope and rises with a slope always proportional at any point to the magnitude of α. Thus, the heading component $m\int\alpha dt$ due to the operation of the integrating system 67, 91, 71 (Fig. 1) or 67', 67'', 91', 209 (Fig. 2) is increasing at the highest rate when the displacement α of the craft is maximum at point 112, and thereafter continues to increase (though at a diminishing rate) even while the displacement of the aircraft is decreasing.

Curve 133 is a plot of the sum of the values of curves 131 and 132, representing the total deflection θ of the craft heading from the initial heading of 90° (i. e. from φ). This curve reaches a maximum of −22° at point 135, the deflection from the initial 90° craft heading being greatest at this point, and the craft heading being 68° (68°=90°−22°=θ+α). This heading is such as to cause the airplane to progress through points of diminishing α, with the result that curve 131 slopes downward, and the steepness of curve 132 decreases progressively, until the craft has returned along an approach path curving toward parallelism with course 103. The aircraft is represented at 141 on the course 103 with a heading deflected 13° to the leftward, i. e. a heading of 77°. This heading combats the cross wind from the northward, for the craft to proceed substantially along the course 103.

While the embodiment of the invention in Fig. 3 has been described as involving an omni-range radio positional reference system, it is similarly applicable to an instrument landing receiving system, or a radio range system of the type defining fixed radial course "legs" or paths, or to a course line computer system working in conjunction with radio positional receiving equipment to define, by output signals, the craft displacement from an arbitrarily selected line. Thus, any radio arrangement or related system defining a course in space and capable of providing signals representing displacement from the course may be used to supply signals such as those provided in Fig. 3 through elements 201, 203, 205, 45 and 63.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for guiding a craft along a selected course line of bearing of a radio transmitting station, comprising a radio direction finder, a directional reference device, means coupled to said direction finder and said directional reference device and adjustable to the selected course line of direction for producing a first signal varying according to deviation of the bearing of the radio station from the direction of the selected course, means for producing a second signal varying according to deviation of the heading of the craft from a preset heading corresponding to the direction of said course, automatic craft steering means responsive to said first and second signals for varying the heading of the craft to maintain balance between said first and second signals, and means responsive to said first signal for gradually introducing a change of the craft heading maintained in the absence of bearing deviation.

2. Apparatus for guiding a craft along a selected course line of bearing of a radio transmitting station, comprising a radio direction finder, a directional reference device, means coupled to said direction finder and said directional reference device and adjustable to select the desired course line of direction for producing a first signal varying according to deviation of the bearing of the radio station from the direction of the selected course, means for producing a second signal varying according to deviation of the heading of the craft from a preset heading corresponding to the direction of said course, automatic craft steering means responsive to said first and second signals for varying the heading of the craft to maintain balance between said first and second signals, and integrating means responsive to said first signal for gradually varying the craft heading and bearing deviation relation to restore the craft to progress along the selected course.

3. Apparatus for guiding a craft along a selected course line of bearing of a radio transmitting station, comprising means including a radio receiver for producing a first signal varying according to variations of the bearing of the radio station, means for setting said first signal producing means for providing null signal output when the craft is on a predetermined line of bearing with respect to the radio station, means for producing a second signal varying according to deviation of the heading of the craft from a selected heading for progress along the course, automatic craft steering means responsive to said first and second signals for varying the heading of the craft according to variations of the difference of said first and second signals, and integrating means responsive to said first signal for gradually introducing a change of the craft heading and bearing deviation relation maintained by said craft steering means.

4. Apparatus for guiding a craft along a selected course line of bearing of a radio transmitting station, comprising means including a radio receiver for producing a first signal varying according to deviations of the bearing of a radio transmitting station, a directional reference device, means coupled to said device and including a heading selector for producing a second signal varying according to deviations of the craft heading from the heading selected for progress along the selected course line of bearing, means for steering the craft according to the difference between said first and second signals, integrating means responsive to said first signal for providing mechanical movement in an extent proportional to the time integral of said first signal, and means coupled to said last means for introducing an angular correction in the craft heading porportional to the extent of said movement.

5. Apparatus as defined in claim 4, wherein said means for introducing an angular correction comprises means for gradually changing the adjustment of said heading selector.

6. Apparatus as defined in claim 4, wherein said means for introducing an angular correction comprises means for introducing a third signal proportional to said mechanical movement and in reinforcement of said first signal, whereby said steering means deflects the craft heading to the extent to make said second signal balance the sum of said first and third signals.

7. Apparatus as defined in claim 4, wherein said first signal producing means comprises an omni-directional range receiver for providing an output signal varying according to the displacement between a reference signal and a directive antenna pattern rotational signal both transmitted by an omni-directional range transmitting station.

8. Apparatus as defined in claim 4, wherein said first signal producing means comprises an automatic radio direction finder receiver including a motor-driven directional receiving antenna, and means coupled to said antenna for providing a signal varying according to the space orientation of said receiving antenna.

9. Apparatus for guiding a craft along a selected course, comprising means including a radio receiver for producing a first signal varying according to displacement of the craft from the course, a directional reference device, means coupled to said device and including a heading selector for producing a second signal varying according to deviations of the craft heading from the heading selected for progress along the course, means coupled to at least one craft control element for steering the craft according to the difference between said first and second signals, integrating means responsive to said first signal for providing mechanical movement in an extent proportional to the time integral of said first signal, and means coupled to said last means for introducing an angular correction of the course heading proportional to the extent of said movement.

10. Apparatus for guiding a craft along a selected course, comprising means including a radio receiver for producing a first signal varying according to displacement of the craft from the course, a directional reference device, means coupled to said device for producing a second signal varying according to deviation of the craft heading from a heading parallel to the course, means for varying the craft heading according to the difference between said first and second signals, movable means for reinforcing said first signals in an extent proportional to the movement, and reversible drive means responsive to said first signal for gradually moving said movable means in the direction to reinforce said first signal according to the time integral thereof.

11. Craft guiding apparatus as defined in claim 10, wherein said movable means comprises a potentiometer connected in circuit with said first and second signal producing means for providing a voltage in reinforcement of said first signal.

12. Apparatus for guiding a craft along a selective course, comprising means including a radio receiver for producing a first signal varying according to displacement of the craft from the course, a directional reference device, means coupled to said device for producing a second signal varying according to deviation of the craft heading from a selected heading, movable means coupled to said second signal producing means for modifying the heading selection, means responsive to said first signal for moving said movable means gradually at a rate substantially proportional to the displacement of said craft from said course and in the direction to change the craft heading toward said course, and steering means for varying the craft heading according to the comparative values of said first and second signals.

HERBERT H. THOMPSON.

No references cited.

Certificate of Correction

Patent No. 2,482,809 September 27, 1949

HERBERT H. THOMPSON

It is hereby certified that errors appear in the printed specification of the above numbered patent requiring correction as follows:

Column 4, line 51, for "chaft" read *craft*; column 5, line 16, for that portion of the formula reading "$\theta-n\alpha=$" read $\theta=n\alpha=$; column 7, line 54, for "amplifier 65" read *amplifier 65'* ; column 8, line 39 for "fllight" read *flight*;

and that the said Letters Patent should be read with these corrections therein that the same may conform to the record of the case in the Patent Office.

Signed and sealed this 2nd day of May, A. D. 1950.

[SEAL]

THOMAS F. MURPHY,
*Assistant Commissioner of Patents.*